Aug. 14, 1923.
J. ROCK
1,465,060
WOODWORKING TOOL AND METHOD OF FORMING THE CUTTING EDGE THEREOF
Filed July 29, 1922
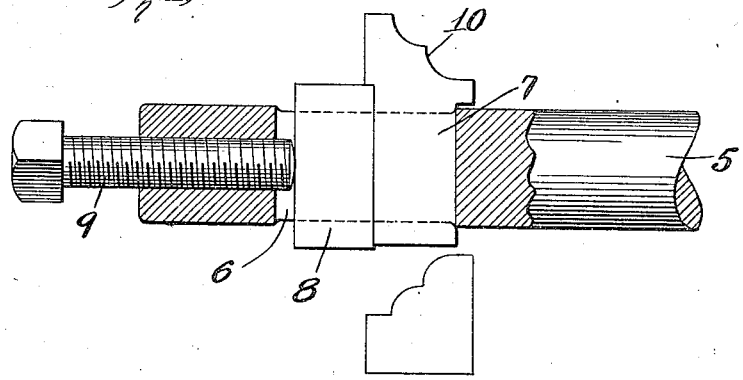
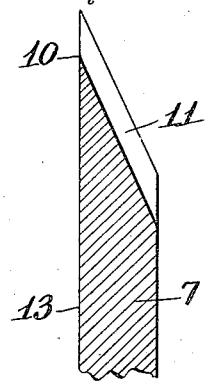 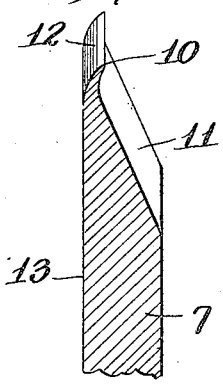 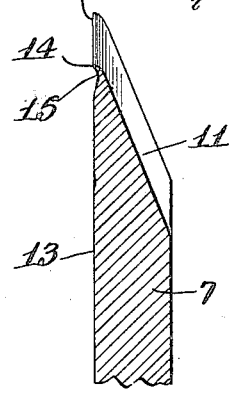
Inventor
James Rock
By his Attorneys
Edgar Tate Patented Aug. 14, 1923.

1,465,060

UNITED STATES PATENT OFFICE.

JAMES ROCK, OF ASTORIA, NEW YORK.

WOODWORKING TOOL AND METHOD OF FORMING THE CUTTING EDGE THEREOF.

Application filed July 29, 1922. Serial No. 578,389.

*To all whom it may concern:*

Be it known that I, JAMES ROCK, a citizen of the United States, and residing at Astoria, Long Island, in the county of Queens and State of New York, have invented certain new and useful Improvements in Woodworking Tools and Methods of Forming the Cutting Edges Thereof, of which the following is a specification, such as will enable those skilled in the art to which it appertains to make and use the same.

This invention relates to woodworking tools and particularly to tools of this class designed for use in what are known as turning machines, and the object of the invention is to provide a tool of the class and for the purpose specified with an improved cutting edge as well as in the method of producing such edge; and with this and other objects in view the invention consists in a tool of the class and for the purpose specified which is simple in construction, and which is constructed in accordance with the method herein set out.

The invention described and claimed herein is based on divisional matter of a prior application filed by me August 22, 1921, Ser. No. 494,047, and is fully disclosed in the following specification, of which the accompanying drawing forms a part, in which the separate parts of my improvement are designated by suitable reference characters in each of the views, and in which:—

Fig. 1 is a sectional detail view of a spindle showing one of my improved tools mounted therein;

Fig. 2 a longitudinal sectional view through the cutting edge of the tool on an enlarged scale, and showing the first step in forming the cutting edge of the tool; and, Figs. 3 and 4 are views similar to Fig. 2 showing the second and third steps in forming the cutting edge of the tool.

For the purpose of illustrating the character of the tool to which my invention relates, I have shown at 5 in Fig. 1, the spindle of a woodworking or turning machine, said spindle being provided with a transverse aperture 6 in which my improved tool 7 is mounted and retained by a slug 8 and set screw 9.

My invention is further limited to tools of the class and for the purpose specified provided with irregular cutting edges 10 for the purpose of cutting moldings or for cutting grooves or depressions in a suitable workpiece as well as in the specific method of forming the cutting edge of the tool.

The first step in the operation of forming the cutting edge 10 consists in beveling one edge portion of the tool as shown at 11 in Fig. 2 of the drawing to form the sharp edge 10, the next step in the operation is to turn the edge 10 in the direction of the bevel 11 as shown at 12 in Fig. 3 of the drawing by the use of a suitable hard tool, and the last step in the operation is to turn the edge 10 backwardly in the direction of the plane face 13 of the tool as shown at 14 in Fig. 4 of the drawing by a similar tool as used in turning the edge as shown at 12 in Fig. 3, and the last operation will produce on the straight face 13 of the tool and adjacent to the cutting edge 10, a slight groove or depression 15 parallel with and in juxtaposition to the cutting edge.

It will be noted that the cutting edge 10 when formed as shown in Fig. 4 of the drawing extends at an angle to the beveled edge 11, and a tool the cutting edge of which is formed in the manner set out when used in a turning or wood-working machine will operate to cut the workpiece rather than to scrap the same. I am aware of the fact that the idea of turning the edge of scraping tools or planing edges is old but in this use the edge has been turned on a tool provided with a straight unobstructed edge, and this edge was formed by a suitable tool to turn said edge in one direction only. With my improvement, however, it will be noted that the edge of the tool is turned first in one direction and then in the opposite direction.

It will be understood that when it is desired to sharpen the cutting edge 10 of the tool after the same has been used, said edge is first turned from the position shown in Fig. 4 back into the position shown in Fig. 3, and then again into the position shown in Fig. 4, and after this has been done a number of times, it will be necessary to re-sharpen the tool which result is accomplished by grinding the plane face 13 thereof to re-sharpen the edge 10, and it will be understood that in the accompanying drawing the turning of the cutting edge 10 is very much enlarged and shown out of proportion for the purpose of clearly illustrating the method of forming the cutting edge and, in practice, this edge is very slight and can hardly be seen, but can be felt by rubbing a finger over the plane face 13, and it will also be noted on a consideration of Fig. 4 of the drawing that the completed edge 10 is in approximately the same plane as the plane face 13 of the tool and does not project beyond said face.

It will be understood that my invention may be applied to tools of any kind or class of irregular cutting edge, such as are commonly employed in woodworking or turning machines, and mounted in connection with a rotatable spindle, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A tool of the class described the cutting edge of which is formed by first beveling one edge of the tool to form a sharp cutting edge, said edge being then turned in the direction of the bevel of said tool and again turned in the opposite direction.

2. A tool of the class described the cutting edge of which is formed by first beveling one edge of the tool to form a sharp cutting edge, said edge being then turned in the direction of the bevel of said tool and again turned in the opposite direction to form on one face of the tool and in juxtaposition to the turned cutting edge a groove or depression extending longitudinally of said edge.

3. The herein described method of forming the cutting edges of woodworking tools which consists in first beveling one edge of the tool, then turning the cutting edge in the direction of the bevel of said tool and again turning it in the opposite direction to form said cutting edge.

4. The herein described method of forming the cutting edges of woodworking tools which consists in first beveling one edge of the tool, then turning the cutting edge in the direction of the bevel of said tool and again turning it in the opposite direction to form said cutting edge and to form a groove on the plane face of the tool in juxtaposition to said cutting edge.

In testimony that I claim the foregoing as my invention I have signed my name this 28th day of July, 1922.

JAMES ROCK.